United States Patent [19]

Mishiro

[11] Patent Number: 4,787,265

[45] Date of Patent: Nov. 29, 1988

[54] TORSION VIBRATOR

[75] Inventor: Shoji Mishiro, Kanagawa, Japan

[73] Assignee: Taga Electric Co., Ltd., Tokyo, Japan

[21] Appl. No.: 905,136

[22] Filed: Sep. 9, 1986

[51] Int. Cl.⁴ .............................................. F16F 15/10

[52] U.S. Cl. ........................................ 74/574; 74/572; 310/49 R

[58] Field of Search ................. 74/551 G, 572, 573 R, 74/573 F, 574; 310/46, 49 R, 74, 103, 105

[56] References Cited

U.S. PATENT DOCUMENTS 3,866,977 2/1975 Rice ...................................... 74/574
4,049,985 9/1977 Sudler .............................. 310/49 R

FOREIGN PATENT DOCUMENTS 50-9159 4/1975 Japan ..................................... 74/574
0142142 11/1980 Japan ..................................... 74/574
0142143 11/1980 Japan ..................................... 74/574
0164430 9/1984 Japan ..................................... 74/574
0201139 10/1985 Japan ..................................... 74/572
1218206 3/1986 U.S.S.R. ................................ 74/574
1218207 3/1986 U.S.S.R. ................................ 74/574

OTHER PUBLICATIONS

Dictionary of Scientific and Technical Terms, McGraw Hill Publisher, 1976 Ed., p. 759.

*Primary Examiner*—Richard E. Moore
*Assistant Examiner*—Vinh Luong
*Attorney, Agent, or Firm*—Oblon, Fisher, Spivak, McClelland & Maier

[57] ABSTRACT

A plurality of block-shaped electrostrictive elements are arranged while polarization directions are coincident to the same circumferential direction, thereby an electrostrictive element to be grasped by metal members is constituted. These block-shaped electrostrictive elements have residual polarization in perpendicular direction to the thickness direction. A rectangular electrostrictive material is cut, thereby a number of block-shaped electrostrictive elements are obtained in one polarization treatment.

2 Claims, 3 Drawing Sheets

TORSION VIBRATOR

FIELD OF THE INVENTION AND RELATED ART STATEMENT

The present invention relates to an ultrasonic vibrator to be utilized in a machine tool for example, and to a torsion vibrator which produces strong torsional vibration.

In the prior art, during machining such as turning, cutting or grinding in a machine tool, if the machining is performed while supplying ultrasonic torsional vibration to a tool, the machining resistance is significantly to decreased, thereby deformation of the machined article is eliminated and the machining is performed at high accuracy, and life of the tool becomes long and material which is difficult to cut can be easily machined. In these uses, a torsion vibrator having relatively strong power is required.

Power which can be generated by a torsion vibrator is small in comparison to a longitudinal vibrator, and the manufacturing process of the torsion vibrator is complicated and the cost is high.

An example of such torsion vibrator is that of Langevin type structure using an electrostrictive member. That is, in the torsion vibrator of Langevin structure, polarization is applied to an annular electrostrictive member in the circumferential direction and the electrostrictive member is provided with electrodes on both surfaces in the thickness direction, and metal members are disposed on both sides of the annular electrostrictive member and tightened integrally by a center bolt or the like.

An example of the electrostrictive member will be described referring to FIG. 10. A plurality of electrodes 2 extending from one surface of an annular electrostrictive material through a lateral surface to other surface thereof are arranged in the circumferential direction uniformly, and DC high voltage is applied between the adjacent electrodes 2 and polarization in the same circumferential direction is performed to every electrode in sequence as shown in arrow. After the polarization, all electrodes 2 are removed and both surfaces are ground again and then electrodes are formed on both surfaces thereby the electrostrictive member 1 is completed. The torsion vibrator is constituted in that a plurality of electrostrictive members are overlaid in parallel electrically, and metal members are contacted with both surfaces of the element and tightened integrally by a center bolt or the like as shown in Japanese patent publication No. 9159/1975.

In the polarization process of the above-mentioned electrostrictive member, however, in order to provide residual polarization in the circumferential direction, the polarization treatment between the adjacent electrodes 2 must be performed by the divided number and therefore the work becomes significantly troublesome. Partial polarization striction during the polarization treatment frequent causes cracking of the electrostrictive element material and the yield may be decreased. Furthermore, when the number of polarizations is small, turning-round electric field in the reverse direction cancels the necessary polarization so as to deteriorate the polarization effect.

OBJECT AND SUMMARY OF THE INVENTION

A first object of the invention is to provide an electrostrictive element wherein polarization of the necessary number in circumferential direction is performed even if the number of the polarization treatments is small.

A second object of the invention is to prevent generation of partial polarization striction during the polarization treatment and thereby prevent generation of cracking of an electrostrictive element material.

A third object of the invention is to enable the polarization treatment without influence of the turning-round electric field.

A fourth object of the invention is to assemble block-shaped electrostrictive elements formed in a dividing into a vibrator without mutual interference.

A fifth object of the invention is to simplify arrangement and assembling of block-shaped electrostrictive elements formed by dividing.

A sixth object of the invntion is to enlarge the effective part of the power transmission areas in the circumferential direction even if the block-shaped electrostrictive elements formed in dividing are used.

In the invention, a plurality of block-shaped electrostrictive elements having residual polarization in perpendicular direction to the thickness direction are formed, the polarization direction of these block-shaped electrostrictive elements is made coincident with the same circumferential direction, electrostrictive elements are separated from each other and formed in annular arrangement into an electrostrictive member. The electrostrictive member and an electrode plate are arranged in an alternating array and; and metal members abut on both surfaces of the alternating array and are tightened by a tightening tool.

Also, a frame body made of insulation material is provided with partition walls disposed between the adjacent block-shaped electrostrictive elements.

Further, the block-shaped electrostrictive elements are formed in sectors.

Since each of the block-shaped electrostrictive element has residual polarization in perpendicular direction to the thickness direction, an electrostrictive element material of rectangular form is polarized in one direction and then cut thereby the block-shaped electrostrictive elements can be easily manufactured. Partial polarization striction is not produced during the polarization treatment and cracks are not produced and moreover the polarization effect is high. Since a plurality of block-shaped electrostrictive elements having residual polarization in perpendicular direction to the thickness direction are separated from each other and arranged in circumferential direction, each block-shaped electrostrictive element is subjected to sliding vibration due to alternating electric field in the thickness direction thereby strong torsional vibration is effected.

Assembling using the frame body secures separation of each block-shaped electrostrictive element and the above-mentioned functions.

DETAILED DESCRIPTION OF PREFERRED EMBODIMENTS

Figure 1:
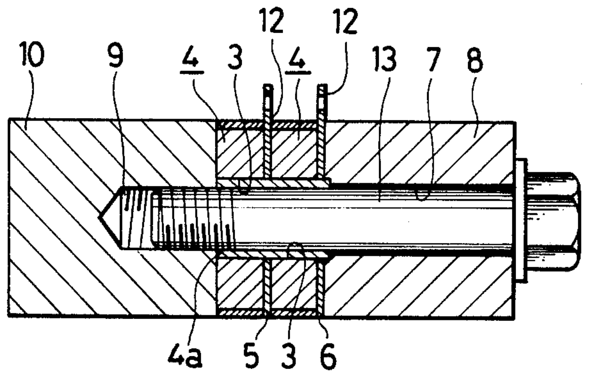
FIG. 1 is a longitudinal sectional side view illustrating a first embodiment of the invention.

A first embodiment of the invention will be described referring to FIGS. 1 through 7. Although detailed structure will be hereinafter described, two electrostrictive members 4 each having a hole 3 at the center are overlaid through an electrode plate 5 interposed therebetween to form an alternating array. An electrode plate 6 having the same form as that of the electrode plate 5 is contacted with an end surface of one electrostrictive member 4, and a metal member 8 having a through hole 7 is contacted with other surface of the electrode plate 6. A metal member 10 having a tapped hole 9 is contacted with the electrostrictive member 4 on an end surface at side where the electrode plate 6 does not exist. Each of the electrode plates 5, 6 has a hole 11 formed at the center and a projection 12 projecting at outer circumferential side. A center bolt 13 as a securing means is inserted from side of the metal member 8 and threadedly engaged with the tapped hole 9 of the metal member 10 thereby the metal members 8, 10 and the electrostrictive member 4 and the electrode plates 5, 6 are tightened integrally. A tubular insulation member 4*a* is arranged at center portion of the electrostrictive member 4.

The electrostrictive member 4 is composed of eight block-shaped electrostrictive elements 14 fitted to a frame body 15 molded by insulation material such as plastics.

Figure 4:
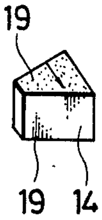
FIG. 4 is a perspective view of a block-shaped electrostrictive element.
Figure 5:
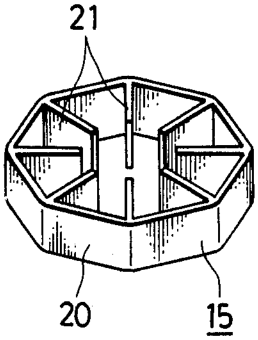
FIG. 5 is a perspective view of a frame body.
Figure 6:
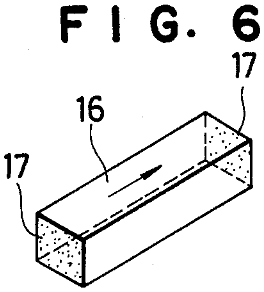
FIG. 6 is a perspective view of a rectangular electrostrictive material.
Figure 7:
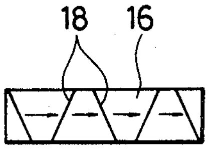
FIG. 7 is a plan view of FIG. 6 but illustrating the cut state.

Each block-shaped electrostrictive element 14 has constant thickness and its plane form is nearly sector-like. In manufacturing the element 14, as shown in FIG. 6, a rectangular electrostrictive material 16 is prepared, and electrodes 17 are formed on both lateral surfaces of the rectangular electrostrictive material 16 in perpendicular direction to the thickness direction and residual polarization is applied in perpendicular direction to the thickness direction as shown by arrows. As shown in FIG. 7, the material 16 is cut by cutting lines changing with every other angle and formed into sectors. After the cutting, driving electrodes 19 are formed on both upper and lower surfaces, so that the block-shaped electrostrictive element 14 as shown in FIG. 4 is formed.

Figure 2:
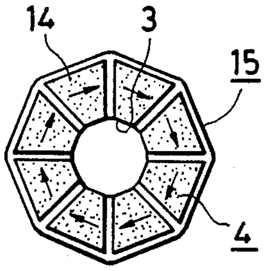
FIG. 2 is a plan view of an electrostrictive element.
Figure 3:
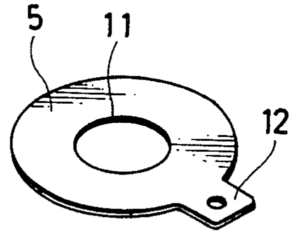
FIG. 3 is a perspective view of an electrode plate.

The frame body 15 has an outer peripheral wall 20 of an 8-sided polygon, and partition walls 21 of constant length are integrally formed from bent portions of the outer peripheral wall 20 towards the center. The block-shaped electrostrictive elements 14 are arranged and assembled in the frame body 15 so that each polarization direction shown by arrow is directed to the same circumferential direction thereby the electrostrictive member 4 is formed as shown in FIG. 2. Consequently, individual block-shaped electrostrictive elements 14 are separated from each other by the partition walls 21.

In this constitution, the electrode plate 5 interposed between the electrostrictive members 4 is made positive electrode and the electrode plate 6 at side of the metal member 8 is made negative electrode, and alternating voltage is applied to these electrode plates 5, 6. If the frequency of the alternating voltage is matched with the torsional resonance frequency of the vibration system which is made integral by the center bolt 13, the torsional resonance vibration is effected at maximum amplitude. For example, the end surface of the metal member 10 is made an output part and the ultrasonic torsional vibration is transmitted to another member. The integral structure in the circumferential direction is not constituted as in an annular electrostrictive element using a sliding mode as in the prior art, but each block-shaped electrostrictive element 14 is separated in structure. In this constitution, however, it is confirmed that vibration is effected well without any abnormal spurious state in the neighboring area.

Since the block-shaped electrostrictive elements 14 are formed as sectors, the circumferential effective part of the electrostrictive member 4 increases and conversion efficiency of an electric machine becomes high so that the structure is effective as a torsion vibrator for power. Such structure may be constituted in integral annular form by bonding or the like, but uniform bonding while holding the surface precision at both surfaces is difficult. Moreover, the vibrator assembled in such manner is apt to cause deterioration of vibration characteristics such as generation of spurious states due to peeling-off of the adhesive agent during assembling or after a lapse of time.

Although the driving electrodes 19 are formed on both surfaces of the block-shaped electrostrictive element 14 in the above description of the embodiment, when the vibrator is assembled as shown in FIG. 1, the driving electrode may be a conductive paint thinly applied to both surfaces for assembling.

Although the center bolt 13 is used for integration with the metal members 8, 10, the tightening tool may be constituted by other tightening methods known in the prior art. For example, the outer circumference may be tightened using a number of bolts, or ring tightening may be used where a metal member with male screws fitted to a contact end portion is tightened by a ring with female screws provided at inner surfaces of both ends.

Figure 8:
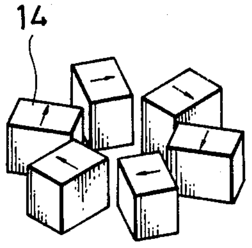
FIG. 8 is a perspective view of block-shaped electrostrictive elements as a second embodiment of the invention.
Figure 9:
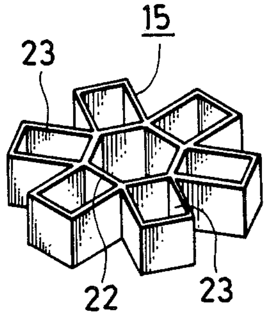
FIG. 9 is a perspective view of a frame body in FIG. 8.
Figure 10:
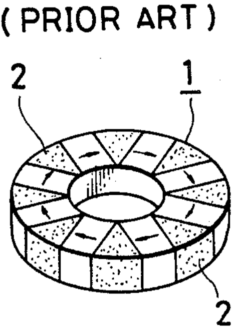
FIG. 10 (PRIOR ART)
FIG. 10 is a perspective view of annular electrostrictive elements during manufacturing in the prior art.

Next, a second embodiment of the invention will be described referring to FIGS. 8 and 9. Like parts to the first embodiment are designated by the same reference numerals, and the description shall be omitted. A block-shaped electrostrictive element 14 in this embodiment is of rectangular or square form, and a frame body 15 has an inner periphery 22 at the center. A holding member 23 of quadrilateral form is constituted integrally with each side of the inner periphery 22 and extends outward, and the block-shaped electrostrictive elements 14 are assembled to these holding members 23 while respective polarization directions are matched with the same circumferential direction.

What is claimed is:

1. A torsional vibrator comprising:

at least two frames of insulating material, said frames each having partitions connected by an outer peripheral wall;

a plurality of block shaped electrostrictive elements forming annular arrangements in each of said frames, said electrostrictive elements in each of said frames being separated by said partitions and having residual polarization in the same circumferential direction so as to form an electrostrictive member having a residual polarization in said circumferential direction in each of said frames;

an electrode plate abutting at least one wall of each of said electrostrictive members transverse to said circumferential direction, said electrostrictive members and electrode plates forming an alternating array in a direction transverse to said circumferential direction;

metal members abutting opposite ends of said alternating array; and means for rigidly securing said metal members and said alternating array.

2. The torsional vibrator of claim 1 including electrodes formed on each of said walls of said electrostrictive members abutted by said electrode plates.

* * * * *